United States Patent
Doshi

(10) Patent No.: US 12,147,306 B2
(45) Date of Patent: Nov. 19, 2024

(54) ADAPTIVE DATA MOVER RESOURCE ALLOCATION IN SCALABLE DATA PROTECTION ENVIRONMENT

(71) Applicant: Dell Products L.P., Round Rock, TX (US)

(72) Inventor: Girish Balvantrai Doshi, Pune (IN)

(73) Assignee: Dell Products L.P., Round Rock, TX (US)

( * ) Notice: Subject to any disclaimer, the term of this patent is extended or adjusted under 35 U.S.C. 154(b) by 86 days.

(21) Appl. No.: 17/656,386

(22) Filed: Mar. 24, 2022

(65) Prior Publication Data

US 2023/0305929 A1 Sep. 28, 2023

(51) Int. Cl.
*G06F 11/14* (2006.01)

(52) U.S. Cl.
CPC ...... *G06F 11/1453* (2013.01); *G06F 11/1464* (2013.01); *G06F 2201/84* (2013.01)

(58) Field of Classification Search
CPC ............. G06F 11/1453; G06F 2201/84; G06F 11/1461; G06F 2009/45583
USPC ........................................................ 707/654
See application file for complete search history.

(56) References Cited

U.S. PATENT DOCUMENTS

| | | | |
|---|---|---|---|
| 11,314,433 B1* | 4/2022 | Barrell | G06F 9/5005 |
| 2015/0363133 A1* | 12/2015 | Bobroff | G06F 9/45504 711/170 |
| 2016/0371153 A1* | 12/2016 | Dornemann | G06F 11/1458 |
| 2016/0373291 A1* | 12/2016 | Dornemann | H04L 67/56 |

* cited by examiner

*Primary Examiner* — Hung T Vy
(74) *Attorney, Agent, or Firm* — Workman Nydegger

(57) ABSTRACT

One example method includes obtaining respective information concerning each asset in a group of assets, performing a deduplication check to identify an entity that will perform deduplication of backups of the assets, based on the information obtained concerning the group of assets, and based on an outcome of the deduplication check, sizing one or more proxy instances that will be needed to create the backups, spawning the proxy instances, and using the proxy instances to create the backups of the data assets.

18 Claims, 3 Drawing Sheets

ADAPTIVE DATA MOVER RESOURCE ALLOCATION IN SCALABLE DATA PROTECTION ENVIRONMENT

FIELD OF THE INVENTION

Embodiments of the present invention generally relate to resource allocation in computing environments. More particularly, at least some embodiments of the invention relate to systems, hardware, software, computer-readable media, and methods for optimizing resource allocation for performance of data protection operations.

BACKGROUND

An ongoing problem in data protection environments concerns how to optimize the cost and time to complete a data movement job in data protection software so that customers incur the lowest possible cost while, at the same time, the work is done in the shortest possible time.

For example, data protection solutions such as the DellEMC Power Protect Data Manager (PPDM) and DellEMC Cloud Snapshot Manager (CSM) have data movers, or compute instances, that may operate to move data from primary/production storage to secondary/target storages, such as the DellEMC Data Domain (DD) platform. In some environments, data protection solutions such as these operate create, on demand, an instance of a data mover for each data copy job. These compute instances are assigned fixed size resources in term of CPU and memory. This fixed size allocation leads to either underutilization and, correspondingly, a waste of resources, or under allocation and, correspondingly, starvation of the job of needed resources. In either case, costs are unnecessarily incurred, and resources sub-optimally employed. Where a job is starved of needed resources, the job may take more time to complete.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
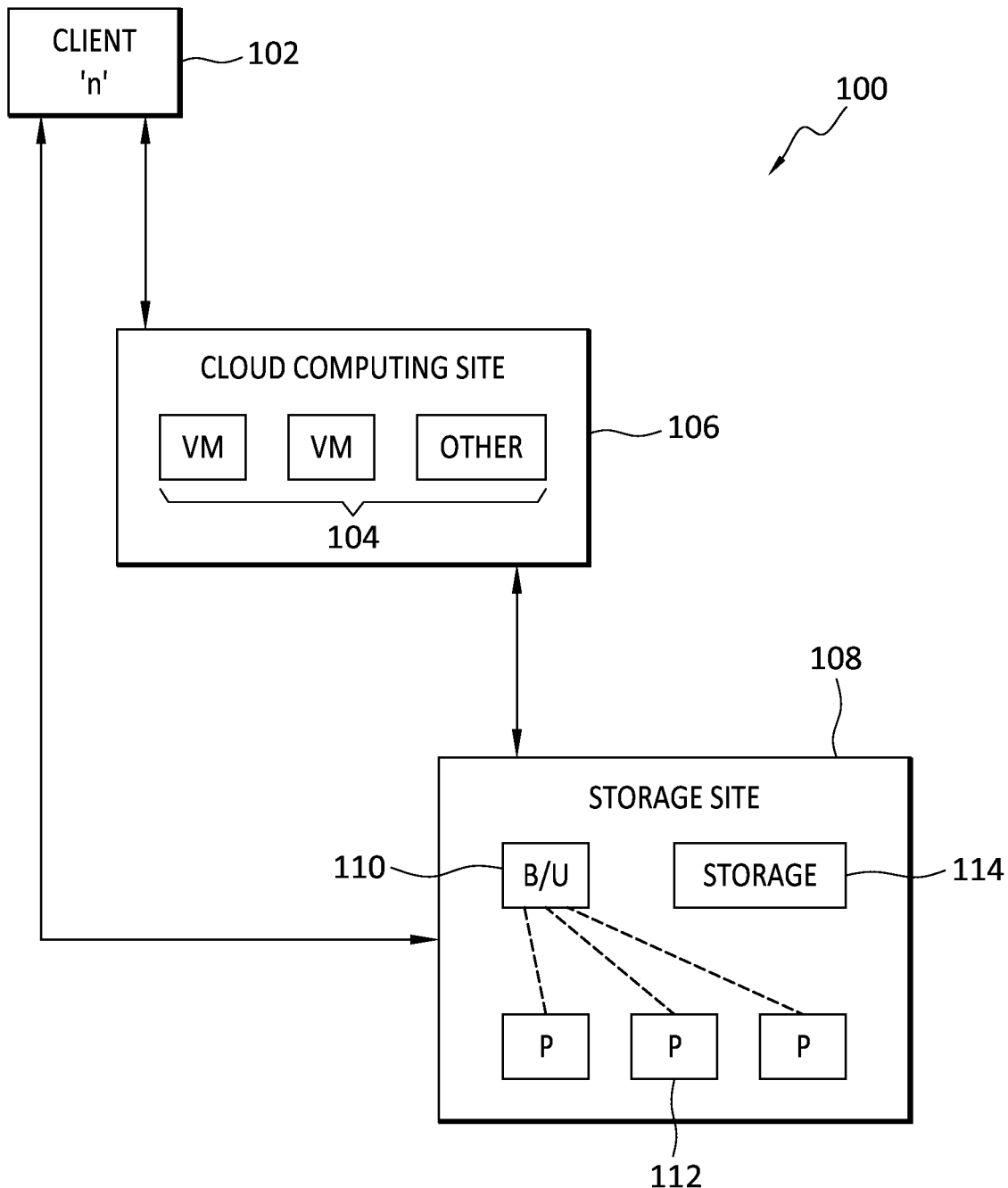
FIG. 1 discloses aspects of example architecture and operating environment, according to some embodiments.

Embodiments of the present invention generally relate to resource allocation in computing environments. More particularly, at least some embodiments of the invention relate to systems, hardware, software, computer-readable media, and methods for optimizing resource allocation for performance of data protection operations.

In general, example embodiments of the invention may provide an adaptive system that creates data mover instances based on criteria such as, but not limited to, the number of data sources from which data will be copied, and whether deduplication, if performed, will be performed at the client side or the server side. Particularly, the number of data mover instances may also be determined with reference to the outcome of a benchmarking process that identifies respective amounts of resources, such as CPU and RAM for example, needed to support the copying of a single stream of data. This resource information, coupled with knowledge of the number of streams to be copied and the performance of deduplication, may enable an accurate determination as to the number of data mover instances that will be created. In some embodiments, the number of data movers may be optimized such that only the number of data movers needed, and no more or less, are created to support the data protection process. Correspondingly, in such embodiments, only the amount of resources needed, and no more or less, are allocated to that data protection process.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, embodiments may operate to optimize resource allocation, and data mover instantiation, so that only the resources and data movers needed are dedicated to a data protection process. Embodiments may operate to reduce, or eliminate, expenses incurred as a result of the over-allocation of resources to a data protection operation. Embodiments may operate to reduce, or eliminate, resource starvation experienced by a data protection process. Such reductions in expenses and resource starvation may be relative to processes that do not employ the disclosed methods.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations, where any of the aforementioned replication, cloning, archiving, data write, and backup, operations may be referred to herein as 'data movement' operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. Other example platforms in which example embodiments may be implemented include, but are not limited to, DellEMC Power Protect Data Manager (PPDM), DellEMC Cloud Snapshot Manager (CSM), and the DellEMC Data Domain (DD) platform. In general however, the scope of the invention is not limited to any particular data protection platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Finally, as used herein, the term 'backup' is intended to be broad in scope. As such, example backups in connection with which embodiments of the invention may be employed include, but are not limited to, full backups, partial backups, clones, snapshots, and incremental or differential backups.

B. Overview

Cloud Snapshot Manager (CSM) is a SaaS (Software as a Service) offering from Dell EMC that protects workloads in public cloud environments such as Amazon AWS and Microsoft Azure by taking cloud native snapshots leveraging APIs (application program interfaces) provided by those cloud vendors. Data from snapshots can then be moved into a cloud data storage environment, such as Dell EMC Data Domain Virtual Edition (DDVE) for example, to reduce storage cost.

For a given job involving data movement from snapshot into DDVE, a compute instance, which may be referred to herein as a proxy, proxy instance, or data mover, with fixed CPU (central processing unit) and RAM (random access memory) size is created on-demand for the copy job and terminated once the job is completed. This compute instance may be, for example, a VM or a container such as a Kubernetes or Docker container. The proxy may have one or more sessions, or streams, to copy data from data sources, such as a VM disk for example, with one session per source, that is, on session or stream per VM disk, in this example. To illustrate, for a copy job for a VM with 3 disks, the proxy will have 3 sessions, one session per disk to copy data from that disk.

Each such session consumes some amount of resources, such as CPU and memory. Therefore, given a fixed size CPU and RAM for the proxy, there is a maximum number 'N' sessions that can be spawned within the proxy at any given point in time. The compute instance, or proxy instance, thus incurs a cost due at least in part to the CPU and RAM allocated to the proxy. Particularly, the cost depends on: (1) the size of the proxy instance; (2) the number of CPUs cores assigned to the proxy instance; the amount of RAM assigned to the proxy instance; and (4) the amount of time that the proxy instance is up and running. In a similar fashion, for PPDM, a new pod instance of vProxy, that is, a data mover, is created on the Kubernetes platform for a copy job. This pod is then destroyed on completion of the job, thus freeing the resources that were assigned to the pod instance.

The CPU and RAM allocation to these data movers are of fixed sizes. Such allocations do not take into consideration factors such as the size of the proxy instance, or the number and nature/intensity of operation being performed during data movement by data mover instance. Regarding the size, and numbers, of proxy instances, some customer environments may employ tens of thousands of workloads, with various sizes and numbers of data sources associated with each of those respective workloads. For example, customers may have thousands of VMs, each with various numbers and sizes of disks. As these examples illustrate, the amount of resources needed to support data movement operations may vary widely depending on the circumstances and the nature of the operating environment.

As alluded to earlier, the nature, and intensity, of operations of a proxy instance may significantly influence the amount of resources needed to support those operations. Particularly, depending on the nature of the data to be moved, and the criticality of that data, for different types of workloads, customers typically have different preferences in terms of performance optimized data copy, or storage optimized data copy. The option chosen by the customer typically implies either client-side deduplication, that is, deduplication to be performed by a client hosted on a customer machine, or server-side deduplication, that is, deduplication to be performed by the backup, or other data protection, server.

In general, client-side deduplication may comprise data chunking, or segmentation, with finger print generation for each of the data chunks, or segments, being performed on the client side, that is, on the side of the entity that is backing up its data to a storage environment, such as DataDomain. This client-side entity is the data mover compute instance. The additional work of deduplication imposed on the client side, increases the CPU and memory requirements per session/stream that is used for the data movement operations from the client to storage.

Thus, having a fixed sized proxy instance typically leads to one of two sub-optimal cases. However, because fixed size proxy instances are relatively easier to define, manage, and use, there is a disincentive to take alternative approaches that might avoid one or both of the sub-optimal cases.

The first of such sub-optimal cases associated with the use of fixed size proxy instances, as briefly noted above, is resource underutilization. For example, suppose that a proxy instance is created with a 1 CPU and 1 GB RAM, and that proxy instance can perform a maximum of three sessions, or streams, in parallel. In this case, a data movement operation performed by the proxy instance for a VM with only one or two disks will result into underutilization of the resources within the proxy instance. That is, the proxy instance can support three streams, but only two streams, at most, are needed to perform the data movement operation for that VM. This underutilization may be further aggravated if the data movement operation involves server-side deduplication, since the proxy instance will not need the resources that may have been allocated to it for client-side deduplication operations.

The other sub-optimal case that arises where fixed size proxy instances are employed concerns resource starvation. In this circumstance, data sources such as VMs with higher number of disks, greater than three for example, can only support data movement from 3 disks at a time, as the fixed size proxy instance is only able to spawn a maximum of three sessions. Later, when the data movement operation for one of the VM disks is complete, the data movement operation for the next VM disk can be picked up. However, this approach requires more time to complete the job than if the proxy instance has been sized to better match with the expected workload. This poses a challenge in completing the job within a given backup window, which is particularly concerning given the ongoing emphasis and focus on reducing the length of backup windows. The situation may be further aggravated if client-side deduplication is being performed, since that will increase the workload on the already strained resources of the fixed size proxy.

B. Aspects of Some Example Embodiments

Among other things, example embodiments implement the adaptive sizing and creation of compute resources for performing operations including data protection operations. In some embodiments, this may be accomplished by leveraging together, and taking into account, considerations such as, but not limited to: (a) knowledge of the size/number of data sources to be protected, such as by copying the data of the data sources to a target; (b) whether deduplication of the data from the data sources will be performed on the client side, or on the server side; and (c) flexible proxy instance sizing capabilities, such as may be implemented in a cloud, or other environment such as Kubernetes. Thus, example embodiments may optimally assign adequate resources for compute resources by flexibly defining and configuring the compute resources to meet workload demands, while also reducing, or eliminating, the problems of resource starvation and resource wastage.

B.1 Environment

With attention now to FIG. 1, details are provided concerning an example environment 100 in which embodiments of the invention may be implemented and used. This environment is provided only by way of illustration and is not intended to limit the scope of the invention in any way.

The environment 100 may include 'n' clients 102, where 'n' is any integer equal to, or greater than, one. The client 102 may be associated with, and control, one or more assets 104, such as VMs for example, that are to be protected. Other example assets 104 include databases, and filesystems. As shown, the assets 104 need not be located on-premises with the client 102, but may be located at a cloud computing site 106 that is accessible by the client 102. Thus, the assets 104 need not be located or hosted at any particular location(s). In general, the client 102 may cooperate with a storage site 108 to create and store backups of the assets 104 of the cloud computing site 106, at the storage site 108.

Note that in some alternative embodiments, the client 102 may not exist as a separate entity as shown in FIG. 1. Rather, in such alternative embodiments, the client 102 may instead comprise a particular collection of assets 104 residing, and managed by a manager entity, at the cloud computing site 106.

Regardless of its form, the client 102, and/or the storage site 108 may include a data deduplication capability, which may enable the client 102 and/or storage site 108 to dedup data, such as backups of the assets 104, before that data is backed up at the storage site 108. In more detail, the storage site 108, which may or may not be a cloud storage site, may include a backup server 110, running a backup application, that may operate to dedup the copies of the assets 104, and then spawn one or more proxy instances 112 to create backups, or backup savesets, of the deduped data. The backup server 110 may further operate to store the backups in storage 114. In some embodiments, the backup server 110 may reside between the cloud computing site 106 and the storage site 108.

The proxy instances 112 may be spawned in any suitable form. For example, the proxy instances 112 may be spawned as a virtual machines, or containers such as Docker containers, on an hypervisors such as VMware ESX, Hyper-V, or Zen, Kubernetes entities. In the case of a cloud environment, the particular form of a proxy instance 112 may depend on the particular hypervisors or container orchestration technologies used by the cloud vendors. In at least some embodiments, the proxy instances 112 are elements of data protection software such as may be hosted on the backup server 110. For example, the PPDM platform has a component referred to as VISD (VProxy Infrastructure Service daemon) that handles the spawning of proxy instances 112.

In more detail, the backup server 108 may be operable to spawn one or more proxy instances 112 that may carry out the backup of the assets 104. In general, and as discussed in more detail below, the size, configuration, and number, of proxy instances 112 may be flexibly determined ad hoc based on considerations such as the backup workload, that is, the amount of work needed to back up the assets 104. For example, the backup server 110 may determine the size and number of assets 104 to be backed up, as well as the number of disks of each asset 104, and these factors, and other factors disclosed herein, may be used by the backup server 110 to determine how many proxy instances 112 are needed to support a particular data protection job. The proxy instances 112 may operate to create backups, such as under the direction of the backup server 110, of the assets 104. The proxy instances 112 may be virtual, since they are typically destroyed after a job is complete. Their virtual nature may enhance the flexibility and speed with which a proxy instance 112 may be instantiated, and deployed.

B.2 Operation of Example Embodiments

With the foregoing in view, example embodiments are directed to an adaptive system of compute sizing that creates proxy instances, or data movers, generally referred to herein as 'compute instances,' considering various factors such as, but not limited to, (1) the number of data sources, such as the assets 104, to copy data from in a single given job, (2) whether deduplication, if performed, will be performed on the client side or the server side, and (3) the flexible proxy instance sizing capability provided by the applicable platform, such as a cloud platform, or a Kubernetes platform that may include one or more clusters that need to be protected, for example.

In general, some embodiments of the invention may operate by starting with a benchmarking procedure which may identify the amount of CPU and RAM, and/or other resources, required for copying a single stream. These numbers may then be used in sizing the compute instance taking into consideration one or more of the various factors disclosed herein. The following example is presented for the purposes of illustration. Suppose that the benchmark numbers per stream/session are as follows:

| Particulars | vCPU | RAM |
| --- | --- | --- |
| Server side dedup | 0.25 | 100 MB |
| Client side dedup | 0.50 | 200 MB |

Also, an accounting may be made for the CPU and RAM that will be needed to run the OS of the proxy instance. For the purposes of illustration, it is assumed that 0.5 vCPU and 500 MB RAM are required to run the base OS.

Taking these benchmark figures into consideration, embodiments may, as part of a job execution, calculate the CPU and RAM requirements to carry out the job, and create one or more proxy instances that may collectively include the optimum type and amount of resources needed to carry out the job. In more detail, CPU size and RAM size for a job with 'n' data sources that need to be protected (where 'n' is any integer equal to, or greater than, one) may be determined thus:

CPU size=(No. of data source(s) in the job*CPU requirement per source for chosen deduplication type)+CPU required to run the OS; and RAM size=(No. of data source(s) in the job*RAM requirement per source for chosen deduplication type)+RAM required to run the OS.

The following example is illustrative:

Note that while this example refers to a VM backup, embodiments are not limited to performance of VM backups but, more generally, the disclosed concepts may be applied to different type of resources such as, but not limited to, databases, and distributed file systems, for example. In general, a resource to be protected may be referred to herein as a 'data protection target.'

| | Example: VM with 2 disks Size of Compute instance will be the sum of: | | | |
| --- | --- | --- | --- | --- |
| | Server Side Dedup | | Client Side Dedup | |
| Particulars | vCPU | RAM | vCPU | RAM |
| Running OS | 0.5 | 500 MB | 0.5 | 500 MB |
| 2 disks so two streams to process | 0.5 (2 * 0.25) | 200 MB (2 * 100 MB/disk) | 1.0 (2 * 0.5) | 400 (2 * 200 MB/disk) |
| Total size requirement | 1.0 vCPU | 700 MB | 1.5 vCPU | 1100 |

Thus, for a data movement job with 'Server side Dedup,' this example will require a computing instance with 1.0 vCPU and 700 MB RAM. A data movement job with 'Client side Dedup' will require a computing instance with 1.5 vCPU and 1100 MB RAM. Among other things, this example illustrates that client-side dedup is more resource intensive than server-side dedup, at least in this example. Thus, a decision may be made to implement server-side dedup so as to conserve resources. Based on the calculations shown above, embodiments may then assign, to a computing instance, an amount of CPU and RAM that either matches or is slightly above the respective calculated values for those resources.

Note that the sizing numbers considered in the illustrated calculations above are presented by way of illustration. The actual numbers to be used may be an outcome of a benchmarking effort. Benchmarking may not necessarily be a frequent activity, at least in some embodiments, and may be limited to performance at those times when there are changes in the operations performed by the computing instances that may impact CPU and/or RAM, and/or other resource(s), utilization per stream.

To support benchmarking efforts, data may be collected concerning the performance of one or more of the compute instances that were created to service a particular workload. This data may indicate, for example, whether the allocated resources were adequate to perform the workload, and if resources were over/under allocated to one or more compute instances. This data may then be used to inform future resource allocations for one or more compute instances. In some cases, resource allocation decisions, which may include initial allocation decisions and adjustments to planned/actual allocations, may be made by a machine learning model that uses the collected data as input.

C. Further Discussion

As will be apparent from this disclosure, example embodiments may possess various useful features, although no particular embodiment is required to possess any particular feature, or group of features. Further, the following example features are provided by way of illustration, and are not intended to limit the scope of the invention in any way.

For example, embodiments may provide for, and enable, optimal utilization of resources. To illustrate, a Kubernetes platform for PPDM may have a definite amount of CPU and RAM available at a given point in time. Embodiments of the invention may enable optimal utilization of the available resources to perform more work/jobs.

As another example, embodiments may help to reduce costs. In particular, in the illustrative case of cloud environments, in which CSM may be implemented, there may be no real bound or limit on available resources. Nonetheless, because there is a cost associated with resource consumption, example embodiments may prove useful at least because such embodiments may help to reduce the cost of operations by eliminating, or minimizing, the wastage of resources in the cloud compute environment.

In a final example, some embodiments may enable faster job completion. In particular, by providing optimal allocation of resources, embodiments may perform operations, such as data copy, from more data sources simultaneously, thus completing jobs faster than would be the case if the methods of example embodiments were not employed.

D. Example Methods

Figure 2:
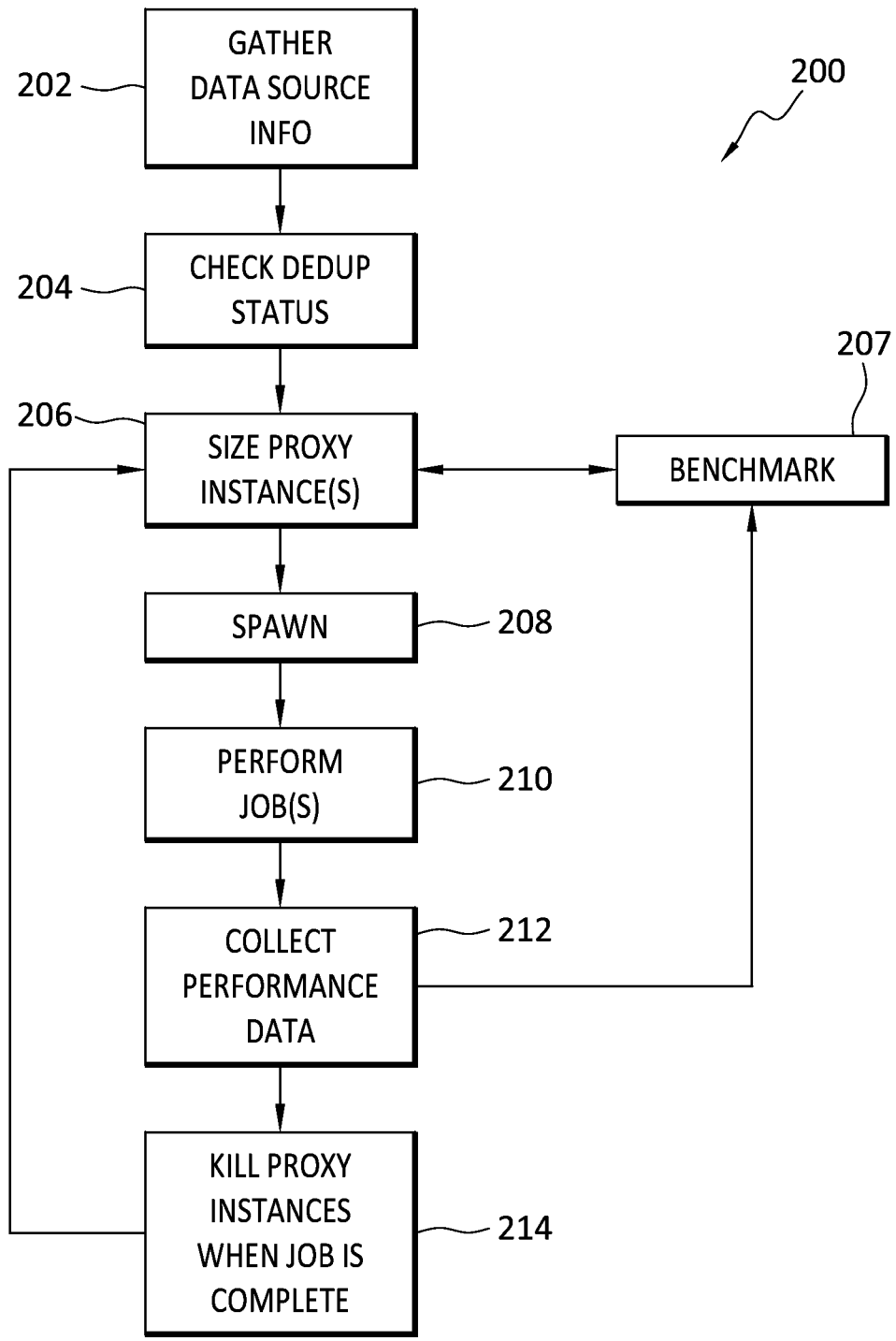
FIG. 2 discloses aspects of an example method for adaptive data mover creation, according to some embodiments.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method 200 is disclosed. The method 200 may be performed, for example, by a backup server operating on a cloud computing platform. In other embodiments, the method may be performed by a backup server operating in a storage environment that communicates with a cloud computing environment. In either case, the cloud computing environment may contain assets, such as VMs for example, that are to be backed up. Such an asset may be referred to herein as a 'backup target.' It is noted that no particular entity, or group of entities, is required to implement the method 200, and the foregoing considerations are presented by way of example.

The method 200 may begin with the gathering of data 202 concerning the assets to be protected by a data protection process. The data may include, but are not limited to, the number of assets, and the number of disks of each asset, that is, the number of disks that are to be backed up.

Next, a deduplication status may be checked 204. The dedup status check 204 may comprise determining whether deduplication of the backup dataset, created by backing up the assets, will be performed at the client, or asset, side, or whether deduplication will be performed at the server, that is, the backup server, side. In some embodiments, the deduplication status may be set as a matter of policy such that it does not need to be checked since there is a known default dedup policy, for example, a dedup policy that specifies for certain assets, dedup will always be performed on the server side.

Given the data that has been collected 202, and the dedup status 204, a process 206 may be performed, based on this information, in which the number of proxy instances needed to support the workload may be determined, and in which each of those proxy instances is sized with respective amounts of CPU and RAM, and/or other resources, needed to complete the data protection job. The configuration, and number, of proxy instances to be used to backup the assets may thus be flexibly determined on an ad hoc basis according to the particular requirements and parameters of the workload. In some instances, a benchmarking process 207 may be performed that generates input that may also be used as part of the process 206.

Once the number and configuration of the proxy instances has been determined 206, those proxy instances may then be spawned 208. The spawned proxy instances may then be deployed 210 to perform the job, such as a data protection operation for one or more assets.

Before, during, and/or, after, the proxy instances perform the job, performance data may be collected 212 concerning the operations and performance of the proxy instances. In some instances, the performance data that has been collected 212 may serve as input to the benchmarking process 207.

Finally, the proxy instances may be killed 214 upon completion of the job which they were created to perform. As a result of the proxy kill process 214, the resources, such as RAM and CPU for example, that were allocated to those proxy instances may be freed for reallocation to one or more other proxy instances that have been, or may be, created.

E. Further Example Embodiments

Following are some further example embodiments of the invention. These are presented only by way of example and are not intended to limit the scope of the invention in any way.

Embodiment 1. A method, comprising: obtaining respective information concerning each asset in a group of assets; performing a deduplication check to identify an entity that will perform deduplication of backups of the assets; based on the information obtained concerning the assets, and based on an outcome of the deduplication check, sizing one or more proxy instances that will be needed to create the backups; spawning the proxy instances; and using the proxy instances to create the backups of the data assets.

Embodiment 2. The method as recited in embodiment 1, wherein the information comprises a total number of assets to be backed up, and a number of disks included in each asset.

Embodiment 3. The method as recited in any of embodiments 1-2, wherein each of the assets comprises any of a virtual machine, a database, or a filesystem.

Embodiment 4. The method as recited in any of embodiments 1-3, wherein the entity identified in the deduplication check is either a client that comprises the assets, or a server that spawns the proxy instances.

Embodiment 5. The method as recited in any of embodiments 1-4, wherein sizing the proxy instances comprises identifying an amount of RAM and an amount of CPU to be allocated, respectively, to each of the assets.

Embodiment 6. The method as recited in embodiment 5, wherein, for a particular one of the assets, the amount of RAM and the amount of CPU allocated to that particular asset is based in part on the particular entity that will perform the deduplication.

Embodiment 7. The method as recited in any of embodiments 1-6, wherein the sizing of the proxy instances is further based on results of a benchmarking process.

Embodiment 8. The method as recited in any of embodiments 1-7, further comprising deduplicating the backups after the backups are created by the proxy instances.

Embodiment 9. The method as recited in any of embodiments 1-8, wherein each proxy instance corresponds to a respective asset.

Embodiment 10. The method as recited in any of embodiments 1-9, wherein one of the proxy instances supports a respective stream for each disk of one of the assets.

Embodiment 11. A system, comprising hardware and/or software, for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
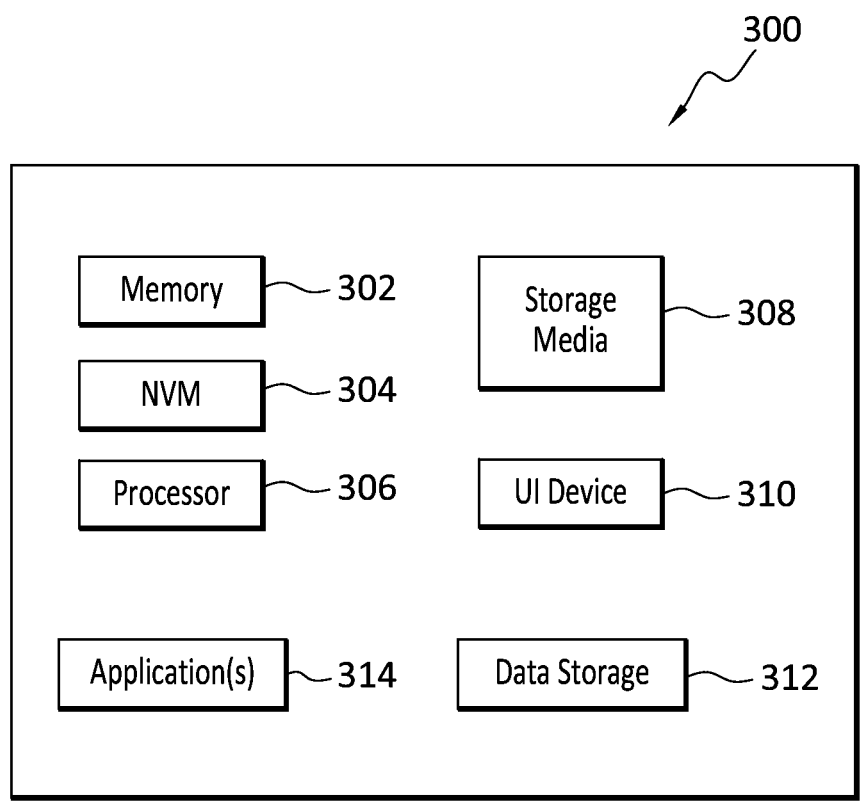
FIG. 3 discloses aspects of an example computing entity operable to perform any of the claimed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 204 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
obtaining respective information concerning each asset in a group of assets;
performing a deduplication check to identify an entity that will perform deduplication of backups of the assets, wherein the entity is either a client that comprises the assets or a server that spawns the proxy instances;
based on the information obtained concerning the assets and the entity identified from the deduplication check, determining a number of proxy instances that will be needed to create the backups, and allocating a flexible amount of RAM and a flexible amount of CPU to the proxy instances;
spawning the proxy instances; and
using the proxy instances to create the backups of the group of assets.

2. The method as recited in claim 1, wherein the information comprises a total number of assets to be backed up, and a number of disks included in each asset.

3. The method as recited in claim 1, wherein each of the assets comprises any of a virtual machine, a database, or a filesystem.

4. The method as recited in claim 1, wherein sizing the proxy instances comprises identifying the flexible amount of RAM and the flexible amount of CPU to be allocated, respectively, to each of the assets.

5. The method as recited in claim 4, wherein, for a particular one of the assets, the amount of RAM and the amount of CPU allocated to the particular asset is based in part on a particular entity that will perform the deduplication.

6. The method as recited in claim 1, wherein the sizing of the proxy instances is further based on results of a benchmarking process.

7. The method as recited in claim 1, further comprising deduplicating the backups after the backups are created by the proxy instances.

8. The method as recited in claim 1, wherein each proxy instance corresponds to a respective asset.

9. The method as recited in claim 1, wherein one of the proxy instances supports a respective stream for each disk of one of the assets.

10. A non-transitory storage medium having stored therein instructions that are executable by one or more hardware processors to perform operations comprising:
obtaining respective information concerning each asset in a group of assets;
performing a deduplication check to identify an entity that will perform deduplication of backups of the assets, wherein the entity is either a client that comprises the assets or a server that spawns the proxy instances;
based on the information obtained concerning the group of assets and the entity identified from the deduplication check, determining a number of proxy instances that will be needed to create the backups, and allocating a flexible amount of RAM and a flexible amount of CPU to the proxy instances;
spawning the proxy instances; and
using the proxy instances to create the backups of the group of assets.

11. The non-transitory storage medium as recited in claim 10, wherein the information comprises a total number of assets to be backed up, and a number of disks included in each asset.

12. The non-transitory storage medium as recited in claim 10, wherein each of the assets comprises any of a virtual machine, a database, or a filesystem.

13. The non-transitory storage medium as recited in claim 10, wherein sizing the proxy instances comprises identifying the flexible amount of RAM and the flexible amount of CPU to be allocated, respectively, to each of the assets.

14. The non-transitory storage medium as recited in claim 13, wherein, for a particular one of the assets, the amount of RAM and the amount of CPU allocated to the particular asset is based in part on a particular entity that will perform the deduplication.

15. The non-transitory storage medium as recited in claim 10, wherein the sizing of the proxy instances is further based on results of a benchmarking process.

16. The non-transitory storage medium as recited in claim 10, wherein the operations further comprise deduplicating the backups after the backups are created by the proxy instances.

17. The non-transitory storage medium as recited in claim 10, wherein each proxy instance corresponds to a respective asset.

18. The non-transitory storage medium as recited in claim 10, wherein one of the proxy instances supports a respective stream for each disk of one of the assets.

\* \* \* \* \*